March 17, 1936. R. A. SWALM 2,034,121
PARKING BRAKE
Filed June 8, 1932 2 Sheets-Sheet 1
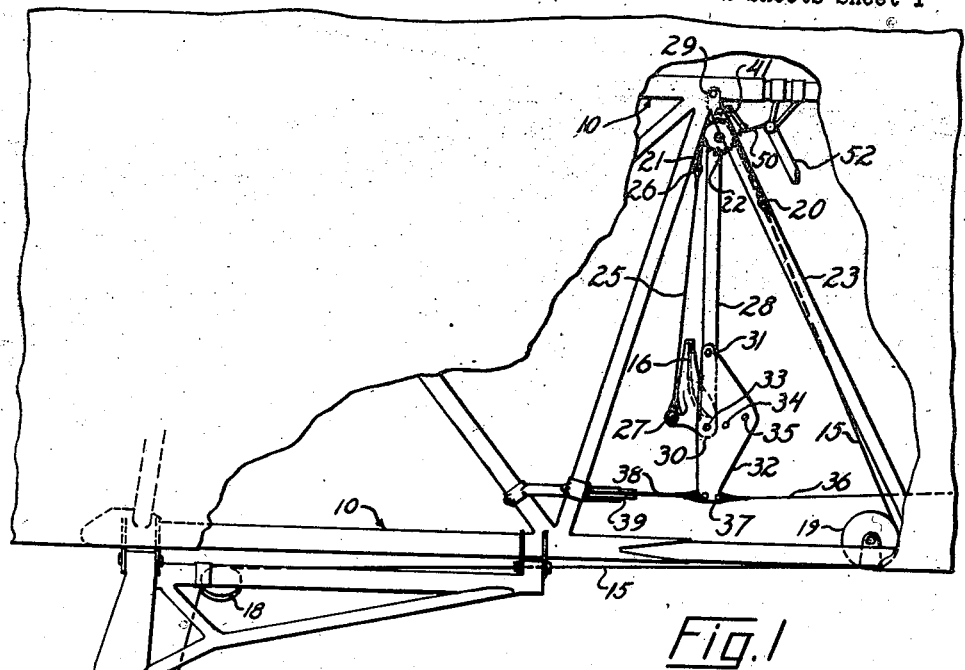
Fig.1
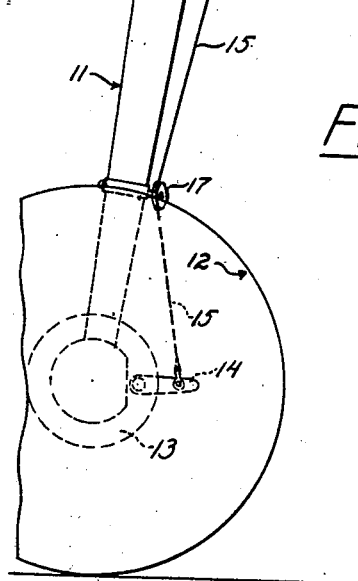
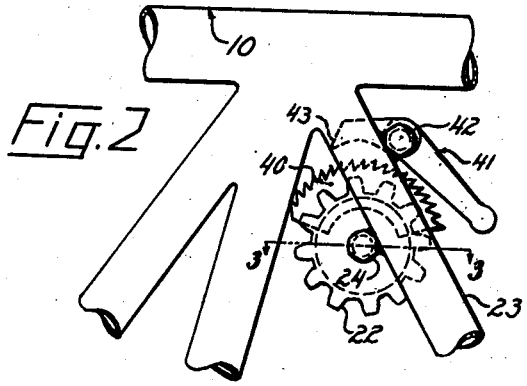
Fig.2
Fig.3
INVENTOR
ROBERT A. SWALM
BY his ATTORNEY

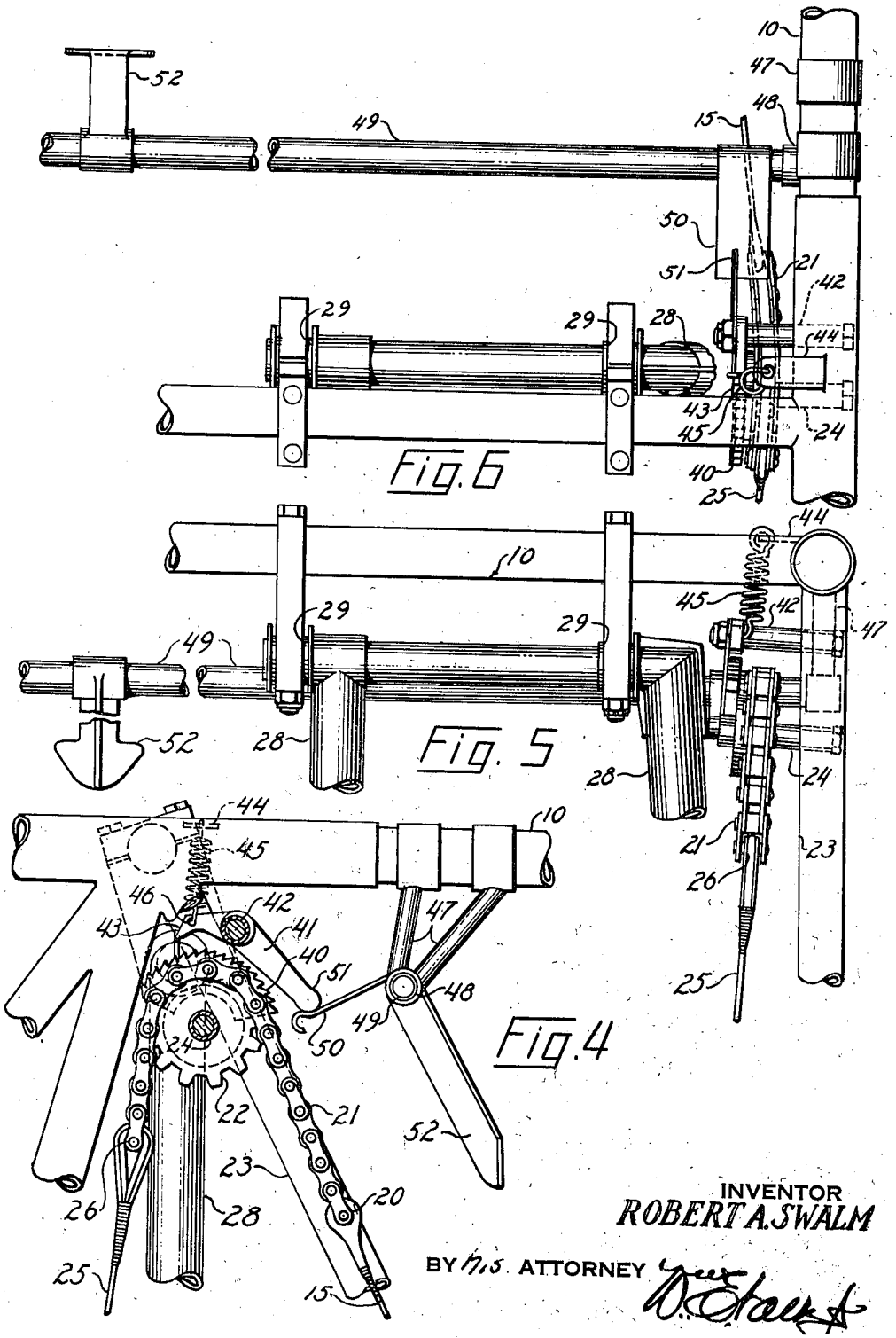

Patented Mar. 17, 1936

2,034,121

UNITED STATES PATENT OFFICE 2,034,121

PARKING BRAKE

Robert A. Swalm, Buffalo, N. Y., assignor to Curtiss Aeroplane & Motor Company, Inc., a corporation of New York Application June 8, 1932, Serial No. 615,986

4 Claims. (Cl. 244—2)

My invention relates to aircraft and more particularly to brake operating mechanism for aircraft landing gears.

Objects of my invention are (1) to provide a means for locking the wheel brakes of an aircraft; (2) to provide a selectively operable locking device whereby the usual foot operated wheel brakes of an aircraft may be maintained in an applied position; (3) to provide a parking brake whereby the aircraft wheels may be locked for starting the aircraft engine, avoiding the use of wheel chocks for parking and starting and eliminating the danger attendant when starting an engine without wheel chocks; (4) to provide brake locking means in conjunction with the usual brake installation, wherein there is no possibility of the locking device interfering with normal operation of the brakes; (5) to provide a brake locking means which may be easily applied and released; (6) to provide a brake locking means which will not be subject to accidental use or misuse; (7) to provide a brake operating mechanism and a locking device therefor in conjunction with the air controls of the aircraft; (8) to provide brake operating and locking mechanism in conjunction with adjustable air control operating means; and (9) to provide brake locking mechanism which is simple in operation and light in weight.

It is now a common practice in airplanes to have brakes for the landing wheels and to have a brake operating mechanism easily accessible to the pilot of the aircraft for use when making landings, when taxiing and when taking off. Usually the aircraft has a pair of landing wheels and a separate brake operating mechanism for each wheel, so that the aircraft may be easily turned when on the ground by applying the brake to one wheel while the other wheel may run free. The operating mechanism for each brake usually consists of a foot pedal pivoted to or adjacent the rudder pedal of the aircraft. Likewise, the brake operating mechanism sometimes includes a manually operated lever and sometimes the brakes are operated by either pedals or manual levers or both. Previously, the brake operating mechanism in aircraft required continued pressure by the pilot to maintain the brakes in an applied condition. As soon as the pressure was released, the wheels were free to rotate.

It is most advantageous under certain conditions to be able to lock the brakes in an applied position, as when parking the aircraft on a landing field, when starting the engine, and in various other maneuvers of the aircraft on the ground. It is, however, undesirable to supply a separate complex mechanism for locking the brakes or a separate set of controls for parking brakes, as this causes a considerable increase in weight and complexity. It is likewise undesirable to have a double set of independently operated controls, since confusion may result in their operation. Particularly in military craft where there are numerous control devices to be operated by the pilot, it is undesirable to increase the complexity of the mechanism as a whole.

By my invention, I am able to provide a simple brake locking mechanism which combines a parking brake with the normal foot operated brake mechanism of the aircraft. In operation, the pilot simply applies the brakes with his feet, and pushes a small lever which locks the brakes in an applied position. Release of the parking brake is accomplished by applying additional pressure to the brake pedals, automatically allowing the locking mechanism to disengage, whereupon the brakes may be operated in a normal manner. Use of the parking brake, therefore, must be intentional on the part of the pilot, and such use is necessary only at a period in the operation of the craft when the pilot has little else to think about. The pilot may release the parking brakes by pressing the brake pedals with his feet, at which time his hands are apt to be fully occupied in the manipulation of the air controls and the engine controls of the aircraft. During and after such release, the pilot need give no thought to brake operation, and can concentrate his efforts upon other important phases of the operation of the aircraft.

The mechanism for operating the parking brakes is simple, compact and at a distance from the other important control devices necessary to the operation of the aircraft. It will be seen hereafter that the manual mechanism for effecting locking of the brakes requires only a light pressure by the pilot after the desired braking pressure has been applied on the brake pedals. It is unnecessary for the pilot to exert the full pressure required for applying the brakes by any other means than his feet. Thus, being accustomed to pedal operation of the brakes, he is able to gauge in a more determinate manner the pressure necessary on the brake operating mechanism to accomplish the degree of braking effort which he may require.

Many aircraft are now equipped with some means of adjusting the rudder control stirrups or pedals independent of the position of adjustment of the rudder. The pilot can accommodate the position of the pedals according to the length of his legs, in order to bring the controls within easy operating reach. My invention also enables my parking brake mechanism to be applied to an aircraft equipped with such adjustable rudder pedals, wherein the parking brake mechanism may be operated wholly independently of the position of adjustment of the rudder pedals. Adjustment of the rudder pedals may be accomplished in the manner prescribed, and no further adjustment of the brake mechanism is necessary to make the parking brake fully operative.

To more fully explain my invention, an embodiment thereof is shown in the drawings appended, wherein similar reference numerals represent similar parts, and in which:

Fig. 1 is a side elevation of an airplane partly broken away, showing the location and relative arrangement of the various brake mechanism parts;

Fig. 2 is an enlarged fragmentary side elevation of the means for locking the brakes applied;

Fig. 3 is a section on the line 3—3 of Fig. 2;

Fig. 4 is a view similar to Fig. 2 showing other and further details of the means for locking the brakes applied;

Fig. 5 is an enlarged side elevation of the brake operating mechanism and its associated locking means; and Fig. 6 is a plan view of the structure illustrated in Fig. 5.

In the embodiment of the invention selected for illustration, the intermediate portion only of an airplane fuselage is shown. The fuselage, designated in its entirety as 10, has fastened thereto, on its underside, a landing gear 11, the landing gear wheels of which (only one being shown) are designated as 12. A brake operating member 14 on the brake mechanism 13 is connected to a cable 15, which is carried over pulleys 17, 18 and 19, and at 20 is attached to one end of a sprocket chain 21. The chain 21 passes over a sprocket wheel 22 pivoted to a fuselage member 23 as at 24. At its opposite end said chain is attached to a cable 25 as at 26. The cable 25 is in turn attached to a bell crank member 27 carried by the brake pedal 16. Operation of the brake by the pilot is effected by depressing the pedal 16, which places the cable 25, the chain 21 and the cable 15 in tension, thus exerting a brake actuating pull on the brake operating member 14.

A rudder pedal 28, pivoted to the fuselage 10 at 29, and having a foot rest 30, serves to actuate a rudder (not shown) at the rear of the airplane. The pedal 28 has attached thereto means for adjusting the position of the foot rest 30 relative to the pilot, such means comprising a member 32 pivoted to the pedal 28 at 31, and the member 32 having formed therein a series of openings 33, 34 and 35. A latch operable by the pilot, and carried by the foot rest 30, is adapted to engage one or another of the openings 33, 34 and 35, and by such engagement, the member 32 is held in fixed relation to the pedal 28. At the lower end of the member 32, a cable 36 is attached at 37, for imparting movement of the rudder pedal 28 to the rudder (not shown). Likewise, a cable 38 is attached to the member 32, passing forwardly around a pulley 39 and engaging the other rudder pedal (not shown) whereby the motion of the two rudder pedals is coordinated. The above describes one of several feasible methods of adjusting the rudder pedals relative to the rudder.

Following is a detailed description of the brake locking mechanism with which my invention is more particularly concerned. The sprocket 22 is provided with an integral toothed sector 40. A pawl 41 is pivoted to the fuselage member 23 at 42, the pawl 41 being provided with a portion 43 adapted to engage with the teeth of the sector 40. The fuselage 10 has fixed thereto a small bracket 44 to which is attached a spring 45, engaging with the pawl 41 at 46. The spring 45 serves to normally hold the pawl 41 out of engagement with the sector 40. To the fuselage 10 is also attached a bracket 47 having a bearing portion 48, in which a member 49 is mounted for rotation. The member 49 has attached thereto a resilient plate 50 adapted to engage with arm 51 of the pawl 41. The member 49 is also provided with an operating lever 52 whereby the pilot may rotate the member 49, thereby causing movement of the resilient plate 50, whereupon the resilient plate 50 engages the arm 51 of the pawl 41, depresses the engaging portion 43 of the pawl 41 against the resilient action of the spring 45 and causes engagement of the pawl with the sector 40.

Should the pilot desire to lock the brake 13 in engagement, he applies pressure to the brake pedal 16, thereby causing counter-clockwise rotation of the sprocket 22 and likewise of the sector 40; when the proper degree of pressure is applied, the pilot manually depresses the lever 52 causing engagement of the pawl 41 with the sector 40 as above described. Then, upon relief of pressure against the brake pedal 16, tension in the cable 25 and in the chain 21 is relaxed causing clockwise rotation of the sprocket 22 and of the sector 40. A tooth of the sector 40 thereupon engages the engaging portion 43 of the pawl 41 and the pawl thereby holds the sector 40 and the sprocket 22 against further clockwise rotation, maintaining thereby a considerable degree of tension in the chain 21 and the cable 15, with a resultant maintenance of braking pressure in the brake mechanism 13.

When the pilot desires to release the brake, he presses against the pedal 16, thereby causing tension in the cable 25 and the chain 21, slightly rotating the sprocket 22 in a counter-clockwise direction. Upon such slight rotation of the sprocket 22 and hence of the sector 40, pressure of the engaging tooth of the sector 40 against the pawl 41 is relieved, whereupon the spring 45 pulls the pawl 41 out of engagement with the sector 40. Then, the pilot may relax all of the pressure against the pedal 16, allowing the wheels to run free. It will be noted that disengagement of the brake locking mechanism above described is accomplished solely by additional pressure against the brake pedal 16 without any manipulation of the lever 52. The lever 52 serves only to cause the engagement of the pawl 41 with the sector 40 when the pilot desires to lock the brakes.

The mechanism above described serves only one brake 13 of the aircraft which, in the embodiment shown, is the left brake. An identical mechanism is duplicated for the right brake (not shown), and the detail description will apply equally to the right hand brake and pedal mechanism.

By this arrangement, unequal pressures may be applied to the right and left brakes, and likewise right and left brakes may be locked with unequal pressure which under certain circumstances might be desirable in the operation of the aircraft.

Likewise, it will be seen that operation of the locking lever 52 is independent of the position of adjustment of the rudder pedal 28 with respect to the member 32 and the rudder cable 36. Likewise, it will be seen that operation of the brake through the pedal 16 is independent of such above described adjustment.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft, a control surface, a pedal, a connection between said surface and said pedal, a lever pivoted to said pedal, a wheel, a brake for said wheel, a connection between said brake and said lever, a wheel around which said brake connection is adapted to pass, and a selectively operable means for locking said last mentioned wheel.

2. In aircraft, a control surface, a pedal, a connection between said surface and said pedal, a lever pivoted to said pedal, a wheel, a brake for said wheel, a connection between said brake and said lever, a wheel around which said brake connection is adapted to pass, and a selectively operable pawl engageable with said last mentioned wheel.

3. In aircraft, in combination, a body, a control surface, a pedal in said body for operation of said surface, a lever movable both with and with respect to said pedal, a toothed wheel pivoted to said body, a brake, a connection from said lever passing around said wheel to said brake, a toothed sector associated with said wheel, and a pawl pivoted to said body and selectively engageable with said toothed sector.

4. In aircraft having a rudder pedal swingable from the frame thereof and having a brake pedal pivoted on said rudder pedal for controlling a wheel brake of said aircraft, a shaft substantially parallel to the pivot axis of said rudder pedal, a sprocket rotatable thereon, a chain running over said sprocket, connections from one end of said chain to said brake pedal and from the other end of said chain to said brake, a toothed sector concentric with and carried by said sprocket, a pawl engageable with said sector, resilient means normally holding said pawl from engagement with said sector, and manually operable means for engaging said pawl with said sector, whereby said last named means may be operated to lock said brake in an applied condition after such condition has been accomplished by pressure of an operator upon said brake pedal.

ROBERT A. SWALM.